United States Patent [19]

Sell et al.

[11] Patent Number: 4,510,393
[45] Date of Patent: Apr. 9, 1985

[54] PHOTO CHAMBER FOR RECORDING CHEMICAL REACTIVITY

[75] Inventors: William J. Sell, San Francisco, Calif.; Joel M. Peisach, Madden, Mass.; David H. Riege, Newark, Calif.

[73] Assignee: Mast Immunosystems, Ltd., Mt. View, Calif.

[21] Appl. No.: 485,172

[22] Filed: Apr. 15, 1983

[51] Int. Cl.³ .................... G01N 23/00; G01T 1/167; G01T 7/00
[52] U.S. Cl. .................... 250/475.2; 250/328; 250/364; 250/472.1
[58] Field of Search .......... 250/472.2, 472.1, 328, 250/364; 378/47, 188, 185, 180, 183, 177, 167

[56] References Cited

U.S. PATENT DOCUMENTS 3,509,340 4/1970 Wood et al. .................... 378/185 X
4,459,360 7/1984 Marinkovich .................... 436/513

OTHER PUBLICATIONS

M. R. Hawkesworth, "The Use of Polaroid Positive Film in Radiography with Beams of Thermal Neutrons", *Non-Destructive Testing*, (Feb. 1971), pp. 45-48.

*Primary Examiner*—Bruce C. Anderson
*Assistant Examiner*—Constantine Hannaher
*Attorney, Agent, or Firm*—Fulwider, Patton, Rieber, Lee & Utecht

[57] ABSTRACT

A portable photo chamber for photographically recording the extent of a chemical reaction such as in an immunological test, wherein a substrate emitting radiation such as gamma radiation is supported in facing contact with a film and with intensifying means, so that exposure time is reduced as a result of emission of further radiation such as a visible light from the intensifying means and its recording on the film. The photo chamber includes retaining means for supporting the substrate, which itself is preferably enclosed in a container such as a pipette, and translating means for moving the substrate into closely facing relationship to the film and also to a spaced-apart position within the chamber. In a preferred embodiment, the photo chamber utilizes an instant photographic system with film processing means attached to the chamber, so that the photo chamber is both portable and self-contained for use in remote locations.

4 Claims, 7 Drawing Figures

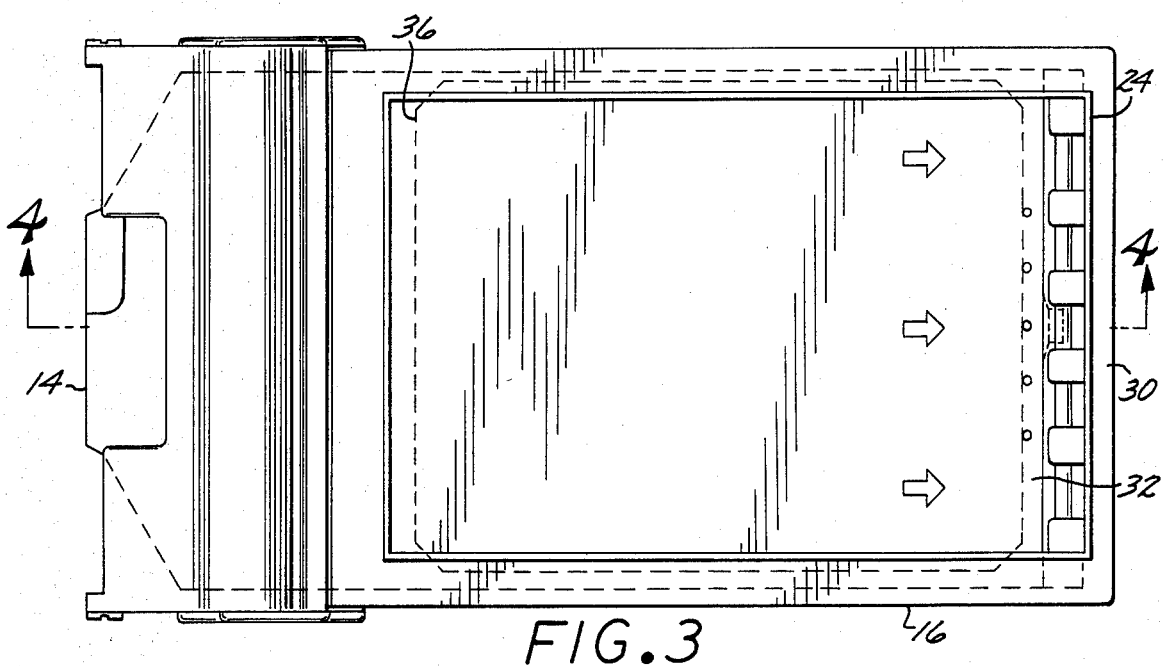
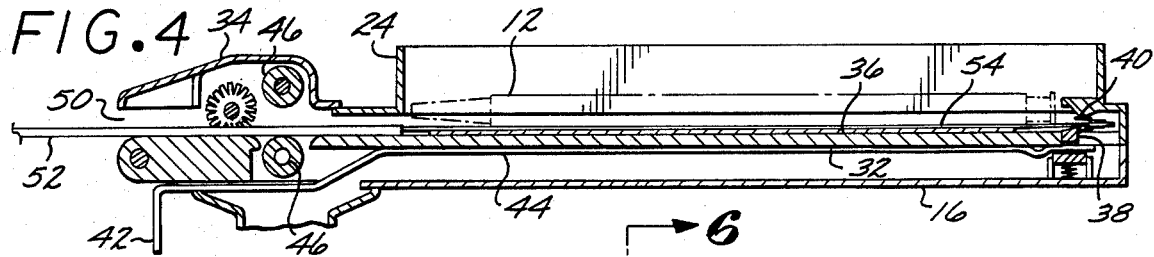
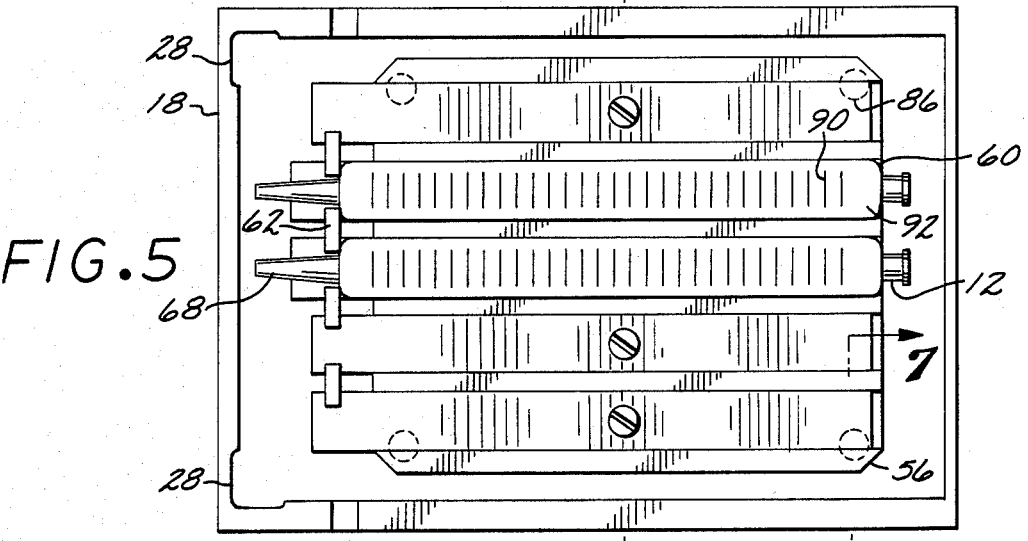
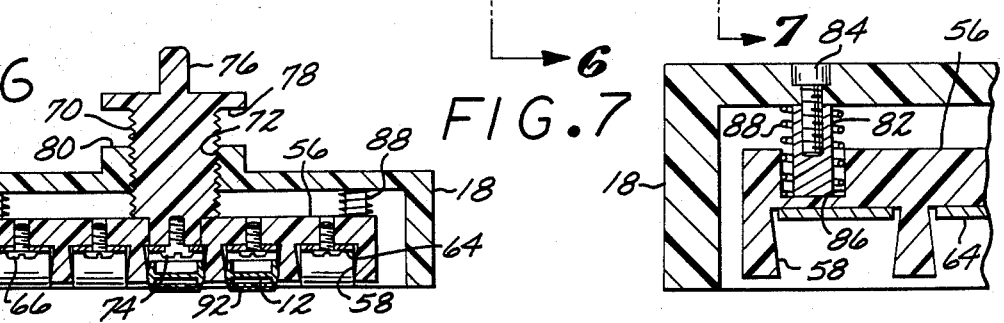

4,510,393

PHOTO CHAMBER FOR RECORDING CHEMICAL REACTIVITY

BACKGROUND OF THE INVENTION

This invention relates to the recording of chemical activities, and more particularly to apparatus for photographically recording the radiation emitted as a result of an immunological or other chemical reaction thereon, for subsequent measurement to determine the extent of the reaction.

A variety of chemical reactions may be evaluated and recorded photographically by radiation emitted directly or indirectly from the reaction, including reactions in the field of immunology. The background of this invention will be discussed in the context of immunology, although the principles are equally applicable in other fields.

One aspect of the field of immunology involves the testing of persons to determine their allergic sensitivity to various substances commonly encountered, such as pollen or animal fur. In an early test to determine sensitivity to various allergens, a sample of the suspected allergen was placed on a patch and the patch was then placed in contact with the person's skin. After several days, the patch was removed and the skin examined to determine the presence of any allergic reaction. Another approach was to inject test materials under the person's skin. These qualitative tests are subject to numerous inaccuracies, are costly and inconvenient for the user and the patient, and at most only one or a few suspected allergens can be evaluated simultaneously.

In a new test for determining allergic reactions, other immunological reactions, or other microbiological interactions, an insoluble carrier coated with a known quantity of a single antigen such as that found in an allergen can be exposed to, and incubated in, a sample of blood withdrawn from the body. If the person is allergic to the particular antigen, a measurable binding reaction occurs during the incubation. A variety of techniques can then be utilized to indicate the extent of such reaction, and one such technique involves the use of a radioimmunoassay, in which the carrier is incubated with a liquid containing radioactively tagged molecules that bind to any serum antibody previously bound to the antigen coated carrier during the incubation.

Once the molecules are tagged, it is necessary that their number be measured in some fashion to determine the extent of the reaction. One approach is to expose photographic film directly to the radioactive portion of the carrier, but this approach requires long exposure times. Alternatively, the gamma radiation produced from the radioactive carriers may be used to produce visible radiation by autoradiographic techniques wherein light is emitted from an intensifying screen under stimulation by the gamma radiation.

While the principles of autoradiography are well known, there has not been provided a convenient apparatus whereby users may prepare photographs using conventional film by autoradiographic techniques, nor has there been provided an apparatus which is portable and self-contained whereby such photographs may be prepared without the need of auxiliary apparatus or a photographic laboratory. Further, such a portable and self-contained apparatus would allow the autoradiographic exposure to be conveniently made at reduced temperatures, which would further reduce exposure times.

Accordingly, there has been a need for a self-contained, portable apparatus for preparing photographic records of the extent of chemical reaction using radiation emitted as a result of the reaction. Such apparatus is particularly desirable in fields such as immunology wherein radioactively tagged reactions on a substrate must be recorded for subsequent measurement and evaluation. The present invention fulfills this need, and further provides related advantages.

SUMMARY OF THE INVENTION

The present invention resides in a photo chamber wherein the reactivity to a testing procedure carried out on a substrate may be recorded on film. The substrate is placed in a retainer within the chamber and the film is loaded and exposed, whereupon the photo chamber may be set aside or placed into an environmentally controlled space for the duration of the exposure time. In a preferred embodiment, the photo chamber is adapted for use of an instant photographic system to record the reaction, whereby the photo chamber is entirely self-contained without the need for conventional film-developing facilities. In this embodiment, test reactivity may be recorded and analyzed at sites remote from a photographic laboratory.

In accordance with the invention, a portable photo chamber for photographically recording the reactivity of a chemical on a substrate to a testing procedure, on a film sensitive to a first type of radiation, the reaction resulting in the emission of a second type of radiation from a substrate, comprises a chamber, intensifying means in the chamber for producing the first type of radiation upon impingement of the second type of radiation, means in the chamber for supporting the substrate and the film in close facing proximity to the intensifying means, and film processing means attached to the chamber for processing the film after exposure.

A preferred embodiment of the invention is specifically adapted for measuring the reactivities of a plurality of threads mounted in a pipette, the threads emitting gamma radiation in relation to the reactivity of species previously contacted on the surface of the substrate. In such preferred embodiment, a portable, self-contained photo chamber utilizes conventional instant film to record the extent of the reaction, the photo chamber including a film back with attached instant-film processing means, a flat intensifying screen joined to a flat inner surface of the film back, a cover adapted for engagement with the film back to provide a light-tight enclosure, and a plurality of retainers mounted on a linear translator mechanism for retaining the pipettes within the cover.

In utilizing the preferred embodiment of the photo chamber, pipettes containing previously reacted substrates are inserted into the retaining means, the cover is installed to the film back, an instant film cassette having therein film protected by an envelope is loaded into the back with the emulsion side of the film in facing relationship to the intensifying screen, the film envelope is withdrawn, and the pipettes are contacted to the back side of the film by the translator mechanism to snugly sandwich the film between the intensifying screen and the pipettes. The photochamber may then be set aside, or preferably placed into a reduced temperature environment, for an extended period, such as overnight, to accomplish the exposure. After the exposure is complete, the pipettes are translated out of contact with the back of the film, the film envelope is reinserted over the film, and the cassette is withdrawn through the film processing means to initiate developing of the film. A positive print is produced in about 10-60 seconds utilizing conventional instant film technology, thus enabing the user to have a permanent record of the reactivity available immediately.

It will be recognized that the present invention utilized together with related inventions for accomplishing the reaction on the substrate and for measuring the photographic film produced by the photo chamber, provides a significant advance for users such as medical personnel. Chemical reactivity tests may be accomplished readily and without the need for specialized photographic processing at remote sites, or where the limited number of tests cannot economically justify the expenditure required for a complete photographic film processing facility. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate a preferred embodiment of the invention. In such drawings:

FIG. 3 is an interior plan view of the film back;

FIG. 4 is a sectional side elevational view of the film back, taken generally along line 4—4 of FIG. 3;

FIG. 5 is an interior plan view of the cover, with two pipettes mounted therein;

FIG. 6 is a sectional end elevational view of the cover, taken generally along line 6—6 of FIG. 5; and FIG. 7 is an enlarged, fragmentary sectional elevational view of a detail of the cover, taken generally along line 7—7 of FIG. 5.

DESCRIPTION OF THE PREFERRED EMBODIMENT

Figure 1:
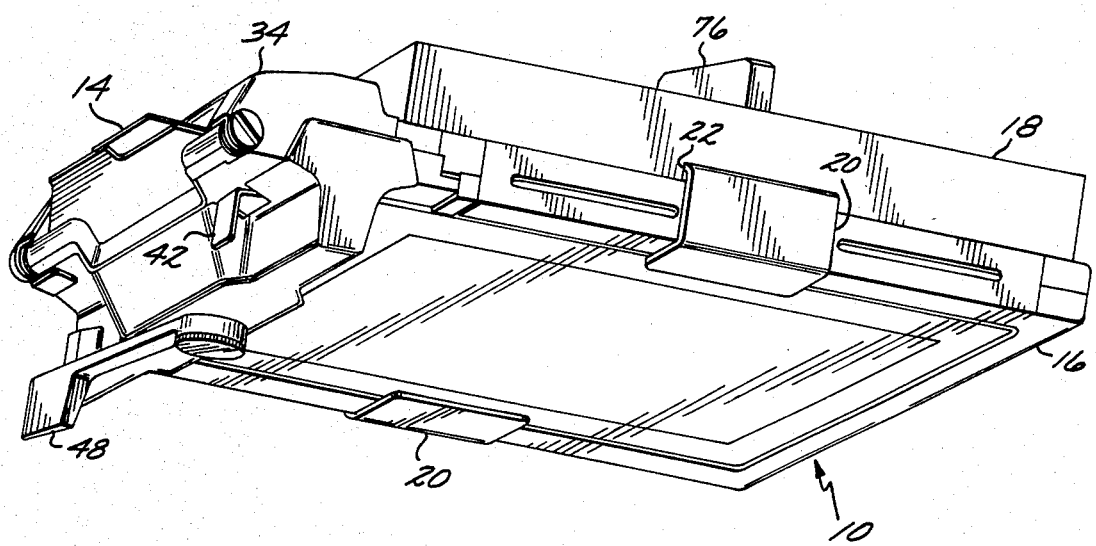
FIG. 1 is a perspective view of a photo chamber in accordance with the invention.
Figure 2:
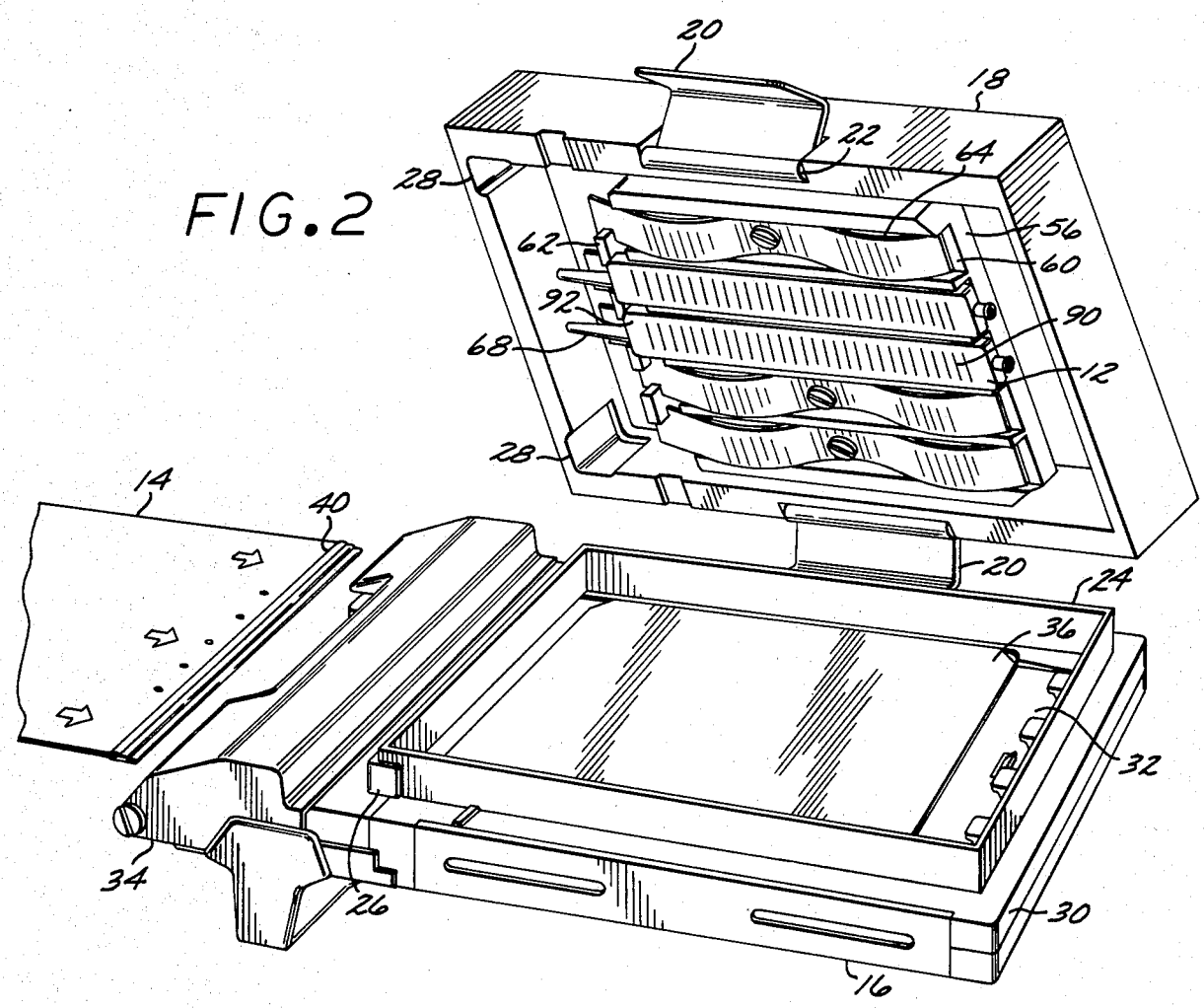
FIG. 2 is a partially exploded perspective view of a film back and a cover of the photo chamber of FIG. 1, with the cover tilted to show its interior.

As is shown in the drawings with reference to a preferred embodiment for purposes of illustration, and particularly in FIGS. 1 and 2, the present invention is embodied in a photo chamber 10 for photographically recording the extent of chemical reactions evidenced by the emission of radioactivity from a substrate (not shown) supported in a pipette 12, on film contained within a film cassette 14. The pipette 12 and the method for preparing the pipette 12 prior to photographically recording the chemical reaction are described in a co-pending and commonly assigned application for U.S. patent, Ser. No. 308,935, filed in the name of Vincent A. Marinkovich and entitled "Multiple Component Binding Assay System and Method of Making and Using It" now issued as U.S. Pat. No. 4,459,360.

In accordance with the present invention, the photo chamber 10 includes a film back 16 for receiving the film cassette 14, and a cover 18 adapted to fit together with the film back 16 to form a light-tight enclosure, the cover 18 having means therein for receiving a plurality of pipettes 12 and positioning the pipettes 12 in proper relation to the film cassette 14. The cover 18 is fastened to the film back 16 by a pair of clips 20 located on either side of the cover 18, each clip 20 being joined to the cover 18 by a hinge 22. The cover 18 is removed from the film back 16 by rotating the clips 20 outwardly about the hinge 22 and lifting the cover 18.

When the cover 18 is reinstalled on the film back 16, it is important that the cover 18 be properly oriented and not reversed in an end-for-end fashion, as identification of the features on the exposed film is aided by use of a standard orientation. To prevent any misorientation, the cover 18 and the film back 16 have cooperating elements to restrict the installation of the cover 18 to a single orientation. The cover 18 is dimensioned so that, upon installation to the film back 16, the wall of the cover 18 slips over an upright, wall-like light baffle 24 on the film back 16. A pair of cover orientation tabs 26 are provided at two adjacent corners of the light baffle 24, and a pair of cooperating orientation cut-outs 28 are provided in the cover 18. The cover 18 can not be reversed end-for-end and assembled to the film back 16, since the opposite ends of the cover 18 have no orientation cut-outs 28 to fit over the cover orientation tabs 26.

The film back 16 includes a film support 30 having an interior flat base plate 32 for supporting a piece of film, and an attached processing unit 34 having therein a mechanism, to be described subsequently, for cooperating with the film cassette 14 in developing the film after exposure. The base plate 32 on the film support 30 is generally rectangular flat piece of about 4 inches by 6 inches in size in the illustrated preferred embodiment. Fixed in about the center of the base plate 32 is an intensifying screen 36 facing upwardly into the interior of the photo chamber 10. The upper surface of the intensifying screen 36 consists essentially of a chemical composition which emits a first type of electromagnetic radiation when struck by a second type of radiation. For example, in the preferred embodiment, the upper surface of the intensifying screen 36 is prepared from a gadolinium rare earth phosphor doped with terbium having a general chemical formulation of $Gd_2O_2S{:}Tb$, which emits visible blue light when struck by gamma rays. Thus, gamma rays emitted from the radioactive isotopes on the substrate in the pipette 12 can strike the intensifying screen 36 to cause the emission of light. Suitable intensifying screens are manufactured by Minnesota Mining and Manufacturing (3M) Company, Minneapolis, Minn. and sold under the name "Trimax Screens".

As illustrated in FIG. 4, the film back 16 includes a mechanical mechanism allowing the insertion, exposure, and processing of film contained in the film cassette 14. A latch 38 disposed at the opposite end of the film back 16 from the processing unit 34 is adapted to engage a hook 40 on the first-inserted end of the film cassette 14. The latch 38 may be disengaged from the hook 40 by pressing a film release control pad 42 which retracts the latch 38 through action of a hook arm 44. A pair of rolls 46 in the processing unit 34 may be moved between two extreme positions by operating a roll separation lever 48 on the outside of the processing unit 34, through a mechanism not shown in the figures. In one position, illustrated in FIG. 4, the rolls 46 are separated, while in a second position (not shown) the rolls 46 are pressed together with the film cassette 14 therebetween.

Film may be exposed and processed in the film back 16 by inserting the film cassette 14 into a cassette slot 50 with the film emulsion facing downwardly toward the intensifying screen 36, until the hook 40 on the end of the film cassette 14 engages the latch 38. During film insertion, the rolls 46 are in the separated position. A film envelope 52 of the film cassette 14 is withdrawn outwardly to expose a film negative 54 to light emitted from the intensifying screen 36. After a sufficiently long exposure time, the film envelope 52 is reinserted over the film negative 54 to prevent further exposure to the light. The roll separation lever 48 is activated to close the rolls 46 to their second position and to press against the film release control pad 42, thereby retracting the latch 38 from the hook 40, and releasing the film cassette 14. The film cassette 14 is then withdrawn from the film back 16. During the withdrawing step, the rolls 46 rupture a sac containing processing chemical (not shown) and spread the chemicals over the film negative 54 to develop a positive print. Film backs having the described mechanism but without the intensifying screen 36 and the light baffle 24 are available in several models from Polaroid Corporation, Cambridge, Mass. In the preferred embodiment, a Polaroid 545 Land Film Holder is utilized with type 57 high speed Polaroid Land Film of ASA 3000 rating as the film cassette 14. A positive print is developed in about 10-60 seconds after withdrawing the film cassette 14 from the film back 16. Such commercially available film back and film cassette are examples of an "instant" photographic system, as that term is used herein. However, the term "instant photography" is not intended to be limited to specific products, and instead refers to a photographic system wherein no separate film developing facility is required. The use of such specific components is not required for practicing of the invention, but desirably the film speed is high in order to shorten the exposure times in the low light levels produced by the intensifying screen 36.

To expose the substrate contained within the pipette 12 properly, the face of the pipette 12 should be pressed flat against the film negative 54 after the film envelope 52 is withdrawn. However, the pipette 12 may not be pressed against the film envelope 52 before it is withdrawn, as the resulting friction will prevent smooth withdrawal or reinsertion of the film envelope 52. Accordingly, retainer and translator means are provided to support the pipette 12 in a position spaced apart from the film cassette 14 during loading of the film cassette 14, withdrawing and reinserting of the film envelope 52, and withdrawing of the film cassette 14. The translation mechanism translates the pipette 12 between a first position firmly contacting the film negative 54 during exposure, thereby sandwiching the negative 54 between the pipette 12 and the intensifying screen 36, and the second position wherein the pipette is spaced apart from the film negative 54.

A retainer block 56 holds one or more, preferably five, pipettes 12 in downwardly facing tapered retainer slots 58. Each retainer slot 58 includes an open end 60 and a partially closed end constituting a pipette stop 62, whereby pipettes 12 may be inserted into the open end 60 until insertion is halted by contact with the pipette stop 62. Each pipette 12 is biased outwardly against the tapered retainer slot 58 by a span spring 64 fastened to the retainer block 56 at about its longitudinal center by a single spring retaining screw 66. The span spring 64 is preferably a shaped steel spring having a wavy cross-section, so that the spring presses against multiple points on the pipette 12 to bias it uniformly downwardly in the retainer slot 58. Pipette 12 may be conveniently inserted into retainer slots 58 by inserting a stem 68 of the pipette 12 into the retainer slot open end 60 against the biasing force of the span spring 64. Insertion is continued until the pipette 12 contacts the pipette stop 62 with the stem 68 protruding therethrough.

The translator mechanism moves the retainer block 56 between the first, or retracted position allowing insertion of the film cassette 14, and the second, or exposure position, with the pipettes 12 in contact with the film negative 54, after the film envelope 52 has been withdrawn. As illustrated in FIG. 6, a threaded cylindrical translator drive rod 70 threadedly engages a translator opening 72 in the upper surface of the cover 18. The translator drive rod 70 is attached to the retainer block 56 by a translator retaining screw 74, which is positioned similarly to the spring retaining screws 66 to retain the span spring 64 in the central tapered retainer slot 58. The translator retaining screw 74 differs from the spring retaining screws 66 by being slightly longer to engage the translator drive rod 70 over a greater length. As a translator knob 76 external to the cover 18 is turned, the attached translator drive rod 70 rotates and moves upwardly or downwardly through the cover 18, thereby moving the retainer block 56 upwardly or downwardly between its first and second positions. Upward motion of the retainer block 56 toward the retracted position is limited by contact of the retainer block 56 with the inside of the cover 18, and downward motion toward the exposure position is limited by contact of a translator stop 78 against a boss 80 on the outside of the cover 18.

The rotational forces produced by rotation of the translator drive rod 70 are reacted against four alignment posts 82, one at each corner of the retainer block 56. As illustrated in FIG. 7, each alignment post 82 is a cylinder internally threaded at one end and fastened to the cover 18 by threadable engagement to an alignment post screw 84. The alignment post 82 projects downwardly into a bore 86 on the upper side of the retainer block 56. A coil spring 88 is placed coaxially over the alignment post 82 to provide equal downward biasing of the retainer block 56 at each of its four corners, thereby uniformly biasing the retainer block 56 downwardly. Thus, as the translator mechanism is operated the rotational forces in the retainer block 56 are reacted against the alignment posts 82 to prevent the retainer block 56 from turning and becoming misaligned, and the coil springs 88 maintain the retainer block 56 levelly oriented, even when fewer than five pipettes 12 are loaded into the retainer block 56.

To prepare a photograph of one or more previously processed pipettes 12, the translator mechanism is adjusted to its exposure position to allow easy access to the retainer slots 58, and the pipettes 12 are inserted into the retainer slots 58. The translator knob 76 is turned to retract the retainer block 56, and the cover 18 with the pipettes 12 contained therein is installed to the film back 16 and attached thereto by the clips 20. The film cassette 14 is inserted into the film back 16 with the emulsion side of the film negative 54 facing downwardly against the intensifying screen 36, until the hook 40 engages the latch 38. The film envelope 52 is withdrawn and the translator knob 76 is turned to move the retainer block 56 downwardly to the exposure position until the pipettes 12 are contacted firmly against the nonemulsion or top side of the film negative 54 to commence the exposure. It is found that the exposure is dependent upon the distance of the substrates within the pipettes 12 from the surface of the film negative 54, and during exposure the substrates within the pipette 12 should be no more than about 0.015 inches from the film negative 54.

During exposure, the film negative 54 is exposed by two different types of radiation. Gamma radiation emitted by isotopes on the substrates within the pipettes 12 is emitted through a plurality of collimating slots 90 in a face plate 92 of the pipette 12. The gamma radiation passes into the film negative 54 and exposes it directly. Since the majority of the gamma radiation passes entirely through the film, the emulsion on the film negative 54 need not face the pipette 12. However, experience shows that very long exposure times are required if formation of features on the film is produced only by the gamma radiation, due to its low level of intensity. To obtain more rapid exposure, the portion of the gamma radiation passing entirely through the film negative 54 strikes the phosphors on the surface of the intensifying screen 36 to emit visible light. The visible light emitted by the intensifying screen 36 strikes the downwardly facing emulsion of the film negative 54, which is in direct contact with the intensifying screen 36. The additional visible light thereby produced accelerates the exposure of the film negative 54.

Additional acceleration of the exposure can be obtained by reducing the temperature of the exposure, which increases the output of light from the intensifying screen 36 for a fixed amount of gamma radiation. Because the photo chamber 10 is portable and self-contained, the entire photo chamber 10 may be placed into an environmentally controlled chamber of reduced temperature, such as a freezer operating at about −20° F. Even greater reductions of temperature would be desirable, but such extremes in temperature are not readily available in many laboratories, doctor's offices, and remote sites. A typical exposure time at −20° F. utilizing ASA 3000 speed film is from about 6 to about 12 hours, although the exposure time is not critical and variations are tolerated.

In another embodiment of the photo chamber 10, a thin layer of a material which emits a first type of radiation such as visible light when struck by a second type of radiation such as gamma rays may be placed between the pipette 12 and the film negative 54. For example, the thin layer may be placed over or in the collimating slots 90 of the face plate 92 on the pipette 12. The thin layer must be of suitable composition, such as the composition of the top layer of the intensifying screen 36. In this alternative embodiment, no image intensifying screen is required in the film back, and the emulsion side of the film negative 54 is oriented upwardly facing the pipette 12.

Upon completion of the exposure, the photo chamber 10 is removed from any environmental chamber, and the exposure is terminated by turning the translator knob 76 to withdraw the retainer block 56 away from the surface of the film negative 54. The film is then processed as described above, by operating the roll separation lever 48 and withdrawing the film cassette 14 to initiate the processing.

It will now be appreciated that through the use of this invention, film records of chemical reactions conducted on substrates may be prepared in a portable photo chamber. In one embodiment, the photo chamber allows photographs to be prepared even when photographic laboratories are not readily available, such as at remote locations. Moreover, the exposures may be readily made in environmental chambers at reduced temperatures to accelerate the exposure process, simply by moving the entire photo chamber into the environmental chamber. Although a particular embodiment of the invention has been described in detail for purposes of illustration, various modifications may be made without departing from the spirit and scope of the invention. Accordingly, the invention is not to be limited except as by the appended claims.

We claim:

1. A self-contained, portable photo chamber for preparing an instant photographic record on visible-light-sensitive film contained in a film cassette having a film envelope over the film, of the activity of a carrier emitting invisible radiation, the carrier being mounted in a pipette having a flat face thereon, the photo chamber comprising:

a film back having a flat inner surface;

a flat intensifying screen joined to said flat inner surface of said film back;

instant-film processing means attached to said film back, said processing means allowing the inserting of the film cassette with the emulsion side of the film in facing relation to said intensifying screen, the withdrawing and subsequent reinserting of the envelope over the film, the withdrawing of the film cassette, and the breaking of a chemical sack containing developer chemicals as the film cassette is withdrawn;

a cover for installation to said film back, said cover and said back being light tight when installed together;

a plurality of retainers within said cover, each of said retainers being adapted for receiving a pipette with the flat face thereof oriented toward said intensifying screen when said cover is installed to said film back;

a translator mechanism supporting said plurality of retainers, said translator mechanism having at least a first position whereat said retainers are spaced apart from the film, and a second position whereat said retainers are positioned adjacent the film so that the flat faces of the pipettes in said retainers are pressed against the side of the film not having an emulsion, said translator mechanism having a control extending externally to said cover to move said retainers between the first and second positions, whereby said retainers may be moved to the first position to allow the withdrawing of the envelope over the film, moved to the second position to expose the film, and again moved to the first position to allow reinserting of the envelope over the film and withdrawing and processing of the film cassette; and biasing means for urging the entire length of the pipettes into contact with the film with said translator mechanism in the second position.

2. The photo chamber of claim 1, wherein said intensifying screen includes light-emitting phosphors on the surface of said screen facing the film.

3. The photo chamber of claim 1, wherein said biasing means includes a spring in each of said retainers.

4. The photo chamber of claim 1, wherein said biasing means includes at least one spring between said plurality of retainers and said cover.

* * * * *